Dec. 26, 1950 — J. Q. BUCKLES ET AL — 2,535,895
AUTOMATIC PROFILE CUTTING MACHINE
Filed Nov. 1, 1945 — 8 Sheets-Sheet 5
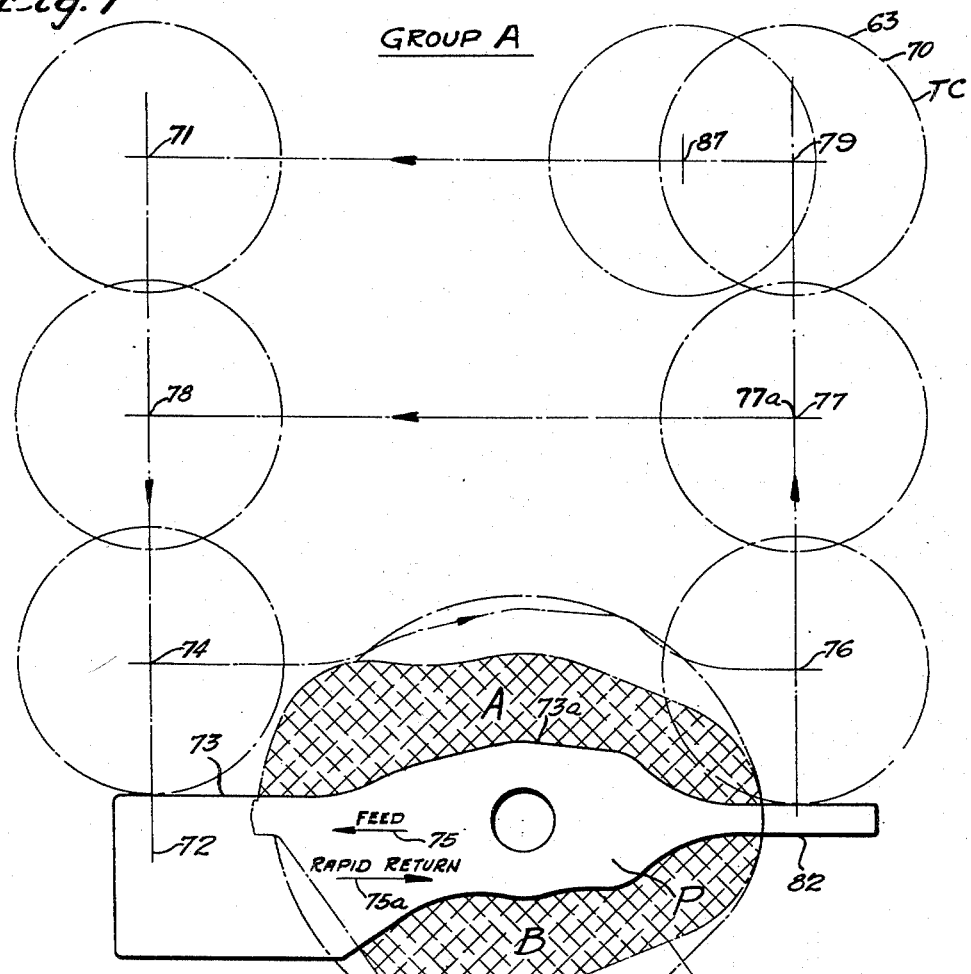
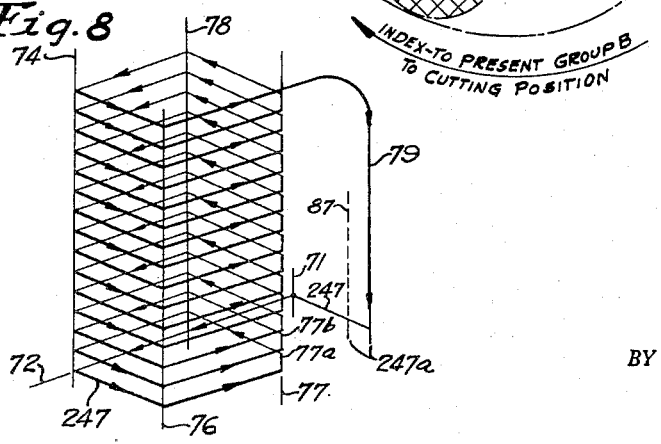
INVENTORS
JOHN Q. BUCKLES
GEORGE A. LENSKY
WINTHROP TRIBLE
BY Leigh W. Wright
ATTORNEY Dec. 26, 1950 J. Q. BUCKLES ET AL 2,535,895
AUTOMATIC PROFILE CUTTING MACHINE
Filed Nov. 1, 1945 8 Sheets-Sheet 6

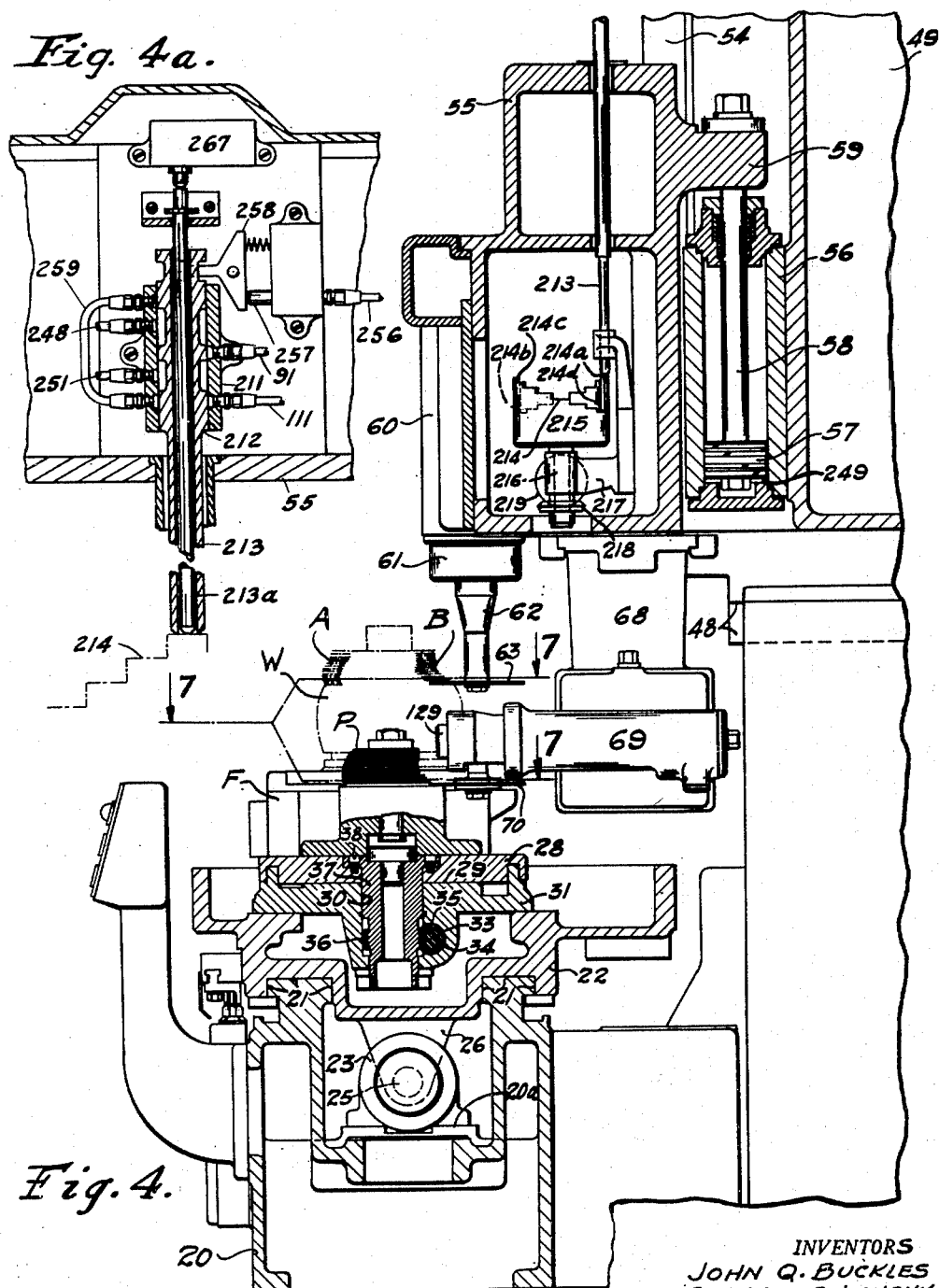

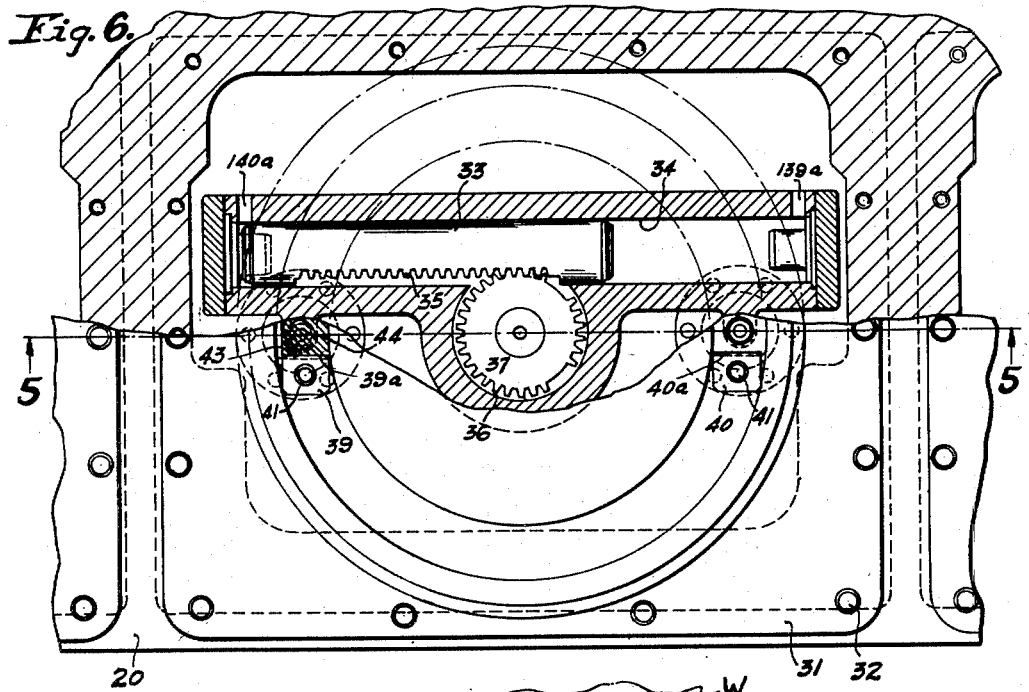

INVENTORS
JOHN Q. BUCKLES
GEORGE A. LENSKY
WINTHROP TRIBLE
BY Leigh W. Wright
ATTORNEY

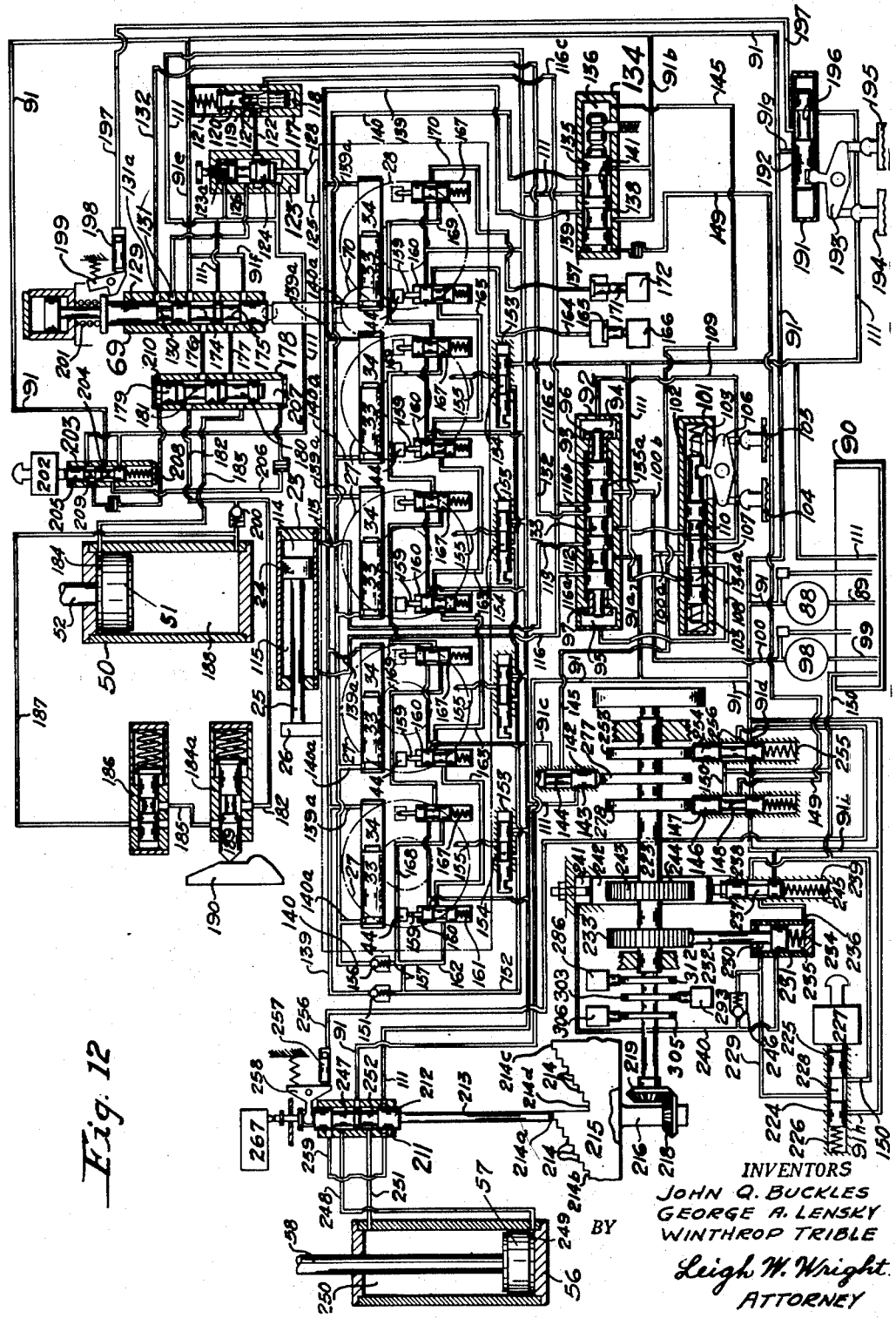

Patented Dec. 26, 1950

2,535,895

UNITED STATES PATENT OFFICE 2,535,895

AUTOMATIC PROFILE CUTTING MACHINE

John Q. Buckles, George A. Lensky, and Winthrop Trible, Cincinnati, Ohio, assignors to The Cincinnati Milling Machine Co., Cincinnati, Ohio, a corporation of Ohio Application November 1, 1945, Serial No. 625,988

25 Claims. (Cl. 90—13.5)

This invention relates to machine tools and more particularly to automatic pattern controlled milling machines.

One of the objects of this invention is to provide a machine for automatically progressively producing profile surfaces on each side of a work piece from a pattern or master.

Another object is to provide a pattern controlled milling machine for successively producing a series of profile surfaces on one side of a work piece, rotate the work to a new position, and successively produce a series of profile surfaces on the other side of the work piece.

Another object is to provide an automatic pattern controlled airplane cylinder head fin milling machine.

Still another object of this invention is to provide an improved automatic pattern controlled milling machine for successively machining a series of non-contiguous profile surfaces on each side of a plurality of work pieces in one continuous automatic cycle.

And a still further object is to provide an improved combined electric and hydraulic operating and control circuit for a pattern controlled profile milling machine.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Throughout the several views of the drawings similar reference characters are employed to denote the same or similar parts.

Figure 4 is an enlarged fragmentary section on the line 4—4 of Figure 1.

Figure 4A is section on the line 4A—4A of Figure 1.

Figure 5 is an enlarged fragmentary sectional view of a portion of the work table and pattern table indexing mechanism on the line 5—5 of Figures 2 and 6.

Figure 6 is a view partly in section on the line 6—6 of Figure 5.

Figure 7 is a diagrammatic view, indicated by the lines 7—7 in Figure 4, showing the relationship of work piece, pattern, cutter, and tracer during the machining of the profile portions on one side of the work piece.

Figure 8 is a perspective three-dimensional diagram showing the path of relative travel of the cutters and work during the machining of the portions on one side of the work piece.

Figure 12 is a diagram of the hydraulic operating circuit for the machine.

This invention contemplates the progressive machining of a series of spaced irregular profile surfaces on each side of a work piece. As an example of a machine incorporating the features of this invention, there is illustrated in Figures 1 and 2 a multiple spindle pattern controlled milling machine adapted to machine slots in airplane cylinder heads to form the desired heat radiating fins.

Work table

Figure 1:
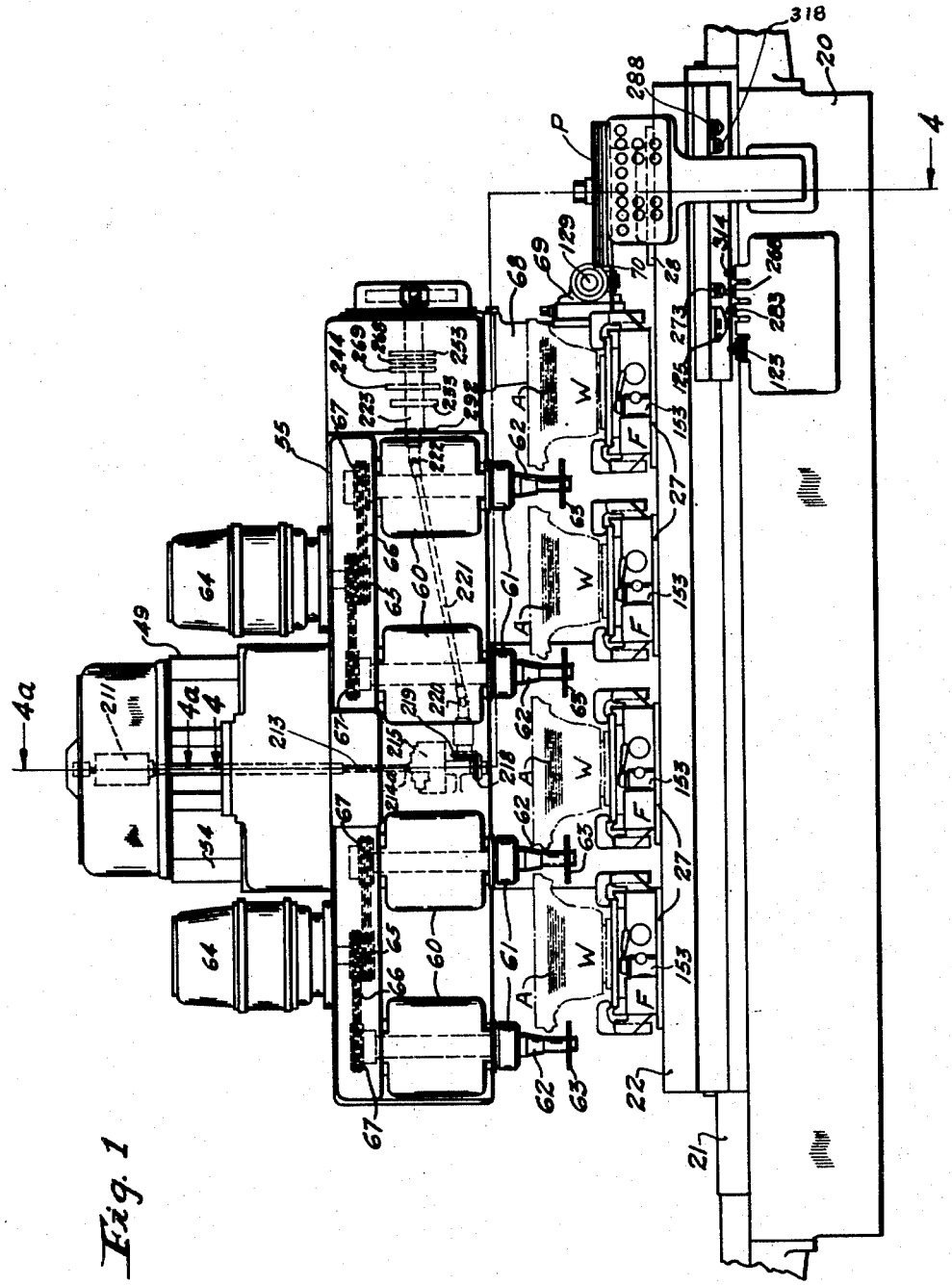
Figure 1 is a front view of a multiple spindle pattern controlled milling machine incorporating the features of this invention.
Figure 2:
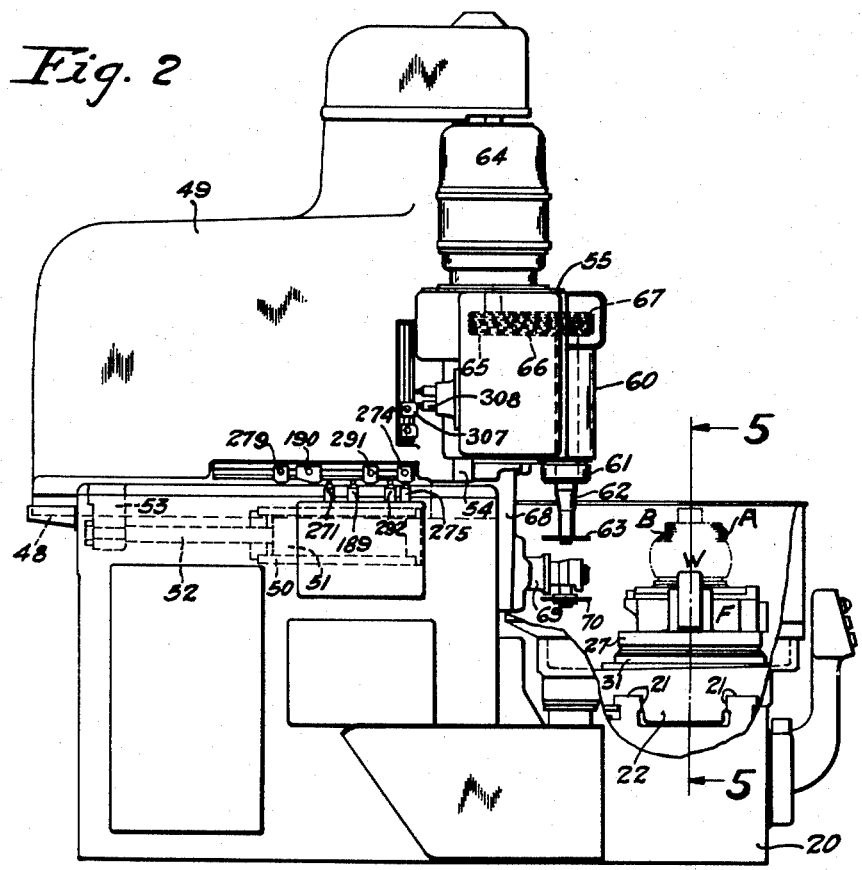
Figure 2 is a left hand end elevation of the machine shown in Figure 1.

Such a machine comprises a base 20, Figure 1, having longitudinally extending guideways 21 upon which a work table 22 is reciprocated by a hydraulic motor comprising a hydraulic cylinder 23, Figures 4 and 12, fixed to the surface 20a of the base 20 and a contained piston 24, connected by a piston rod 25 to an integral boss 26 of the work table 22.

Work and pattern spindles

On the work table 22 is provided a series of work fixtures F having bases 27 and a pattern fixture P having base 28. Each of these fixtures is rotatably journaled, Figures 4 and 5, on the bearing surfaces 29 and 30 formed in the sub-support 31 fixed to the work table 22 by appropriate screws 32. These fixtures may be oscillated or indexed by means of an appropriate hydraulically actuated plunger 33, Figure 6, slidable in a cylinder bore 34 formed in the support 31. Each of the plungers 33 is provided with a rack 35 engaging a gear 36 formed integral with a depending center guide spindle 37 rigidly attached to the platens 27 and 28 by suitable bolts 38. Thus, by applying fluid pressure to one side or the other of the plungers 33, the platens 27 and 28 may be indexed on their bearing supports 29 and 30.

Figure 3:
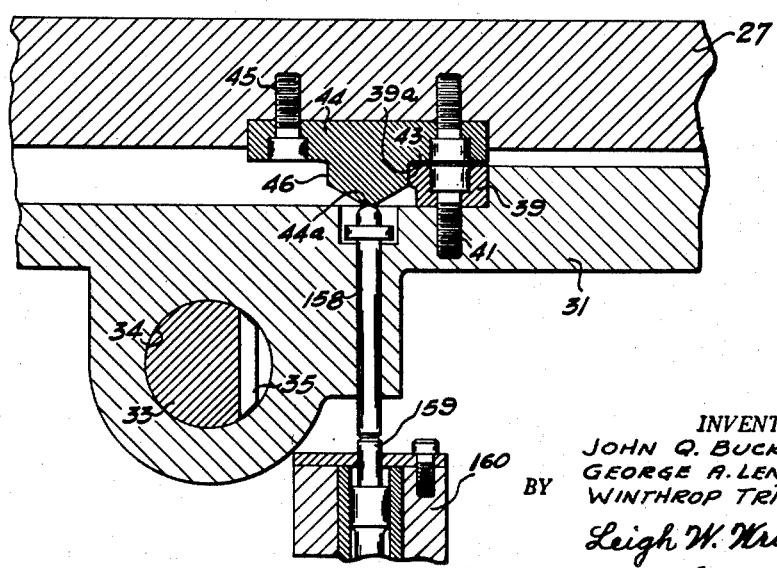
Figure 3 is a fragmentary sectional view on the line 3—3 of Figure 5.

Means are provided for accurately limiting the amount of index comprising a pair of abutment blocks 39 and 40 rigidly fixed to the support 31 by suitable screws 41. These blocks have abutment surfaces 39a and 40a respectively engageable by a mating abutment surface 43 of a dog 44, Figures 3 and 6, attached to the fixtures by suitable screws 45, upon rotation of the fixture in one direction and by an abutment surface 46 of the dog upon rotation of the fixture in the opposite direction. Thus, actuation of the plungers 33 may oscillate or index the work and pattern fixtures through 180 degrees of rotation.

Cross slide

On the rearwardly extending portion of the base 20 are guideways 48, Figure 2, upon which is slidably mounted the cross slide housing 49 for movement to and from the work and pattern fixtures F and P. The cross slide 49 is actuated by means of a hydraulic actuator or cylinder 50 which is rigidly fixed to the base 20 by appropriate means and a piston 51 to which is connected a piston rod 52 which is connected to the cross slide 49 through an integral lug 53.

Tool spindle carrier

On appropriate vertically disposed guideways 54, Figure 4, formed on the front face of the cross slide 49 is mounted the tool spindle carrier 55 which is reciprocated vertically by means of a hydraulic cylinder 56, which is rigidly mounted on the cross slide 49 and a contained piston 57 which is attached by a piston rod 58 to an integral lug 59 of the spindle carrier 55. Thus, upon application of fluid pressure to the cylinder 56 the spindle carrier 43 may be raised or lowered on the guideways 54.

The spindle carrier 55 comprises a horizontally elongated housing portion upon which is fixed a series of spindle brackets 60 in which are journaled the cutter spindles 61. Each cutter spindle carries a cutter arbor 62 upon which is mounted a thin milling or slotting cutter 63. Each pair of spindles 61 is driven by a motor 64 mounted on the spindle carrier 55 and connected through motor pulleys 65 and belts 66 to appropriate pulleys 67 carried by the respective spindles 61 so that the spindles may be rotated at the desired cutting speed for any vertical position of the spindle carrier.

Also carried by the spindle carrier 55 is the tracer support bracket 68 upon which is mounted the tracer control valve 69 having a pattern contacting disc or tracer 70 which is of the same diameter as the cutter 63. This tracer disc 70 is arranged to engage a series of patterns or templates comprising a pattern array P mounted rigidly on the platen 28 as best seen in Figures 1 and 4.

General operating cycle

Figure 9:
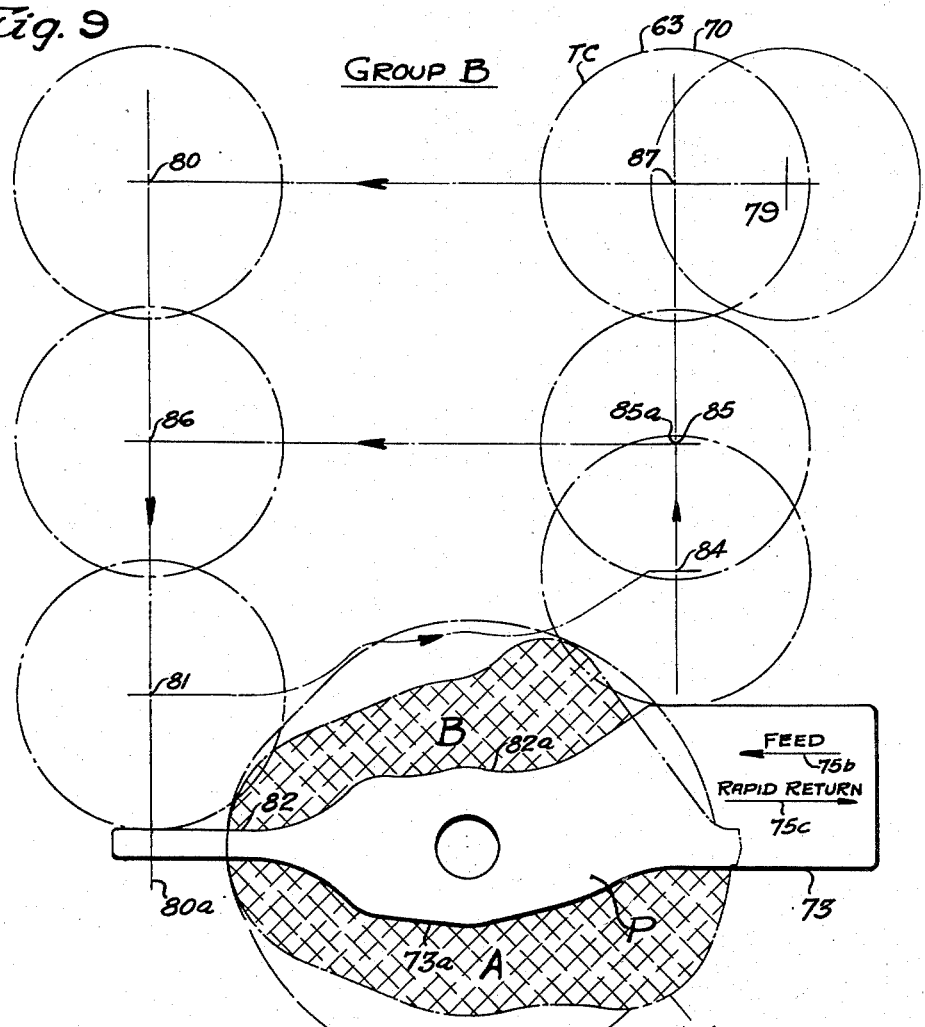
Figure 9 is a diagrammatic view similar to Figure 7 but showing the relationship of work piece, pattern, cutter, and tracer during the machining of the profile portions on the other side of the work piece.

In this particular exemplary disclosure, the work piece comprises an airplane cylinder head W having a main cylindrical body portion on each side of which are to be cut a group or series of slots to form heat radiating fins, one series being of different configuration or depth than the other. On one side of the work W is a group of slots A to be machined to the general configuration shown by the cross hatch portion marked A in Figure 7. On the other side of the work is a group of slots B to be machined to the general configuration of the cross hatch portion indicated at B in Figure 9. In Figures 7 and 9 the pattern or template is shown superimposed in the same relative position upon the work piece to illustrate the relationship of the template and the slots to be cut. There is also shown in these figures a series of circles TC which represent the diameter of both the cutter and the tracer to show the relative positions of these members with relation to the work and template at different stages of the machining cycle.

The template array P is mounted on the platen 28 and the work pieces W are gripped in appropriate work fixtures F on the platens 27 in such a way that they assume the position shown in Figure 7 at the beginning of the cutting cycle. At this time the dog 44, Figures 3 and 6, on the fixtures will be in engagement with the face 39a on the abutment block 39.

For simplicity of illustration, in Figures 7 and 9, the work and pattern fixtures are assumed fixed while the cutters and tracer disc are moved relative to them to their various operating positions as occur in the machining cycle. At the beginning of the machining cycle the cross slide is fully retracted, putting the tracer and cutters in position 71 and the fixtures are to the right of axis 72 whereby the table 22 is in a position to feed to the left. The cross slide moves forward first at rapid traverse and then at a decreasing feed rate moving the tracer disc 70 from 71 to 74 into engagement with the template surface 73. This arrests further inward movement of the cross slide and establishes the tracer in control of the cross slide.

The work table 22 then starts feeding as indicated by the arrow 75 causing the tracer to follow the irregular profile surface 73a and the cutters to machine the first slot in group A in the work. The cutters and tracer ultimately arrive at the position 76, Figures 7 and 8, to thereby complete the profile milling of the first slot in group A.

At position 76 the table feeding movement stops and the cross slide moves the cutters and tracer back to the position 77. At this position the spindle carrier is moved or indexed upwardly a sufficient amount to position 77a, Figure 8, to bring the cutters and tracer disc into proper alignment for cutting the next successive slot in group A.

At the completion of the indexing at position 77a the work table 22 returns at rapid traverse as shown by the arrow 75a, thereby relatively positioning cutter and tracer disc at 78 in Figures 7 and 8. The work table 22 stops and the cross slide advances again to move the cutter and tracer from position 78 to position 74. The cycle of cutting the next slot repeats.

At the completion of the machining of this next slot, the cross slide again withdraws to position 77 where again upward indexing to position 77b, Figure 8, takes place for machining the third slot. The table at rapid traverse returns to position 78 and this cycle of operation continues until all of the slots have been progressively machined in group A.

At the completion of the machining of the last slot in group A with the cutters in the position 76, the cross slide is caused to fully withdraw to position 79, Figure 7, but during the withdrawal at position 77 the spindle carrier is moved downwardly, to return the cutters and tracer to the starting plane. With the cutters and tracer at position 79 the fixtures are indexed clockwise 180 degrees, Figure 7, to present the other side of the work for slotting. The work table 22 then rapid returns to bring the cutters and tracer to the position 80 in Figure 9, whereupon the cross slide advances to position the cutters and tracer at 81 with tracer disc engaging the surface 82 of the first template of group B to thereby establish tracer control of the cross slide movement. The work table then feeds in the direction 75b with the tracer following the irregular profile surface 82a of the first template of group B. The table 22 stops at position 84, and the cross slide withdraws the cutters and tracer to position 85. At this position the spindle carrier indexes up a sufficient distance to present the cutter and tracer to position 85a to cut the next succeeding slot of group B. The work table 22 then rapid returns as indicated by the arrow 75c to bring the cutters and tracer to the position 86. The cross slide then advances to repeat the cycle and cut the next slot in the work.

After all the slots have been cut in group B, the cross slide withdraws to the fully retracted position 87, the downward return movement of the spindle carrier also taking place at position 85. When point 87 is reached the fixtures are indexed counterclockwise 180 degrees, Figure 9, and the work table 22 rapid returns to bring the cutter and tracer disc into the starting position 71, Figure 7, for unloading the completed work.

Hydraulic operating system

The work table, fixtures, cross slide, and spindle carrier are hydraulically operated and controlled by a hydraulic control circuit shown diagrammatically in Figure 12. Referring to this figure, fluid pressure for reciprocating the work table is derived from a main pump 88 which withdraws fluid through suction line 89 from reservoir 90 and delivers it under pressure to line 91 which is connected through a branch line 91a to the pilot operated table feed and rapid traverse control valve 92. This control valve has a hydraulically shiftable plunger 93 and is provided at each end with pressure chambers 94 and 95 in which are centralizing bushings 96 and 97 which are effective to locate the plunger 93 in an intermediate position when the pressure is simultaneously applied to both chambers 94 and 95.

Fluid pressure for the pressure chambers 94 and 95 is supplied from an auxiliary pump 98 which withdraws fluid through a suction line 99 from the reservoir 90 and delivers it under pressure through line 100 and branch line 100a to the table pilot control valve 101. This valve has a plunger 102 which is normally centered by appropriate compression springs 103 located at each end of the plunger and is actuated in one direction or the other by electrical solenoids 104 and 105 connected to it by an appropriate bell crank operating lever 106. The solenoids are part of an electrical circuit shown in Figure 11 to be described later.

The feeding direction of movement of the work table 22 is instituted by a dog 279 on the cross slide 49 causing energization of the solenoid 104 when the cross slide has completed its advance so as to shift the valve plunger 102 in pilot valve 101 to the left, thus connecting pressure from line 100a through the annular groove 107 of the plunger 102 to the line 108 leading to the pressure chamber 95 of valve 92 so as to shift the plunger 93 to the right. Fluid is discharged from chamber 94 through line 109, annular groove 110 of valve plunger 102 to the drain line 111 for return to the reservoir 90. Shifting of the plunger 93 connects pressure from line 91a through annular groove 112 and line 113 to the chamber 114 of the table actuating cylinder 23 whereby the piston 24 feeds the work table 22 to the left.

Fluid is discharged from the other end of chamber 115 of the cylinder 23 through line 116, branch line 116c, to a feed approach throttle valve 117. This valve has a plunger 120 and a pressure chamber 118 in one end adapted to receive fluid from the line 116c through groove 127 and an interdrilled passageway 119 in valve plunger 120 whereby the fluid pressure continuously urges the plunger against a compression spring 121 provided in the other end of the valve. A line 122 is connected to an auxiliary control valve 123 having a plunger 124 which is actuated by a cam 125 carried by the work table 22 in such a way as to control axial movement of the plunger by a spring 123a and open the discharge from line 122 into line 126 and thereby change the pressure in chamber 118 of the valve 117 to increase the rate of discharge of fluid through the line 116c, causing the table to increase its rate of movement.

Thus, as the table begins to move forward, the valve plunger 124 begins to ride down on the tapered surface 128 of the cam 125, causing feed rate to increase as the table feed movement gets under way. The purpose of this arrangement is to initially feed the cutters into the work gradually and then increase the feed as the full depth of the cutters becomes effective.

The rate of movement of the work table 22 is also subject to variation by the tracer valve 69. This valve has a valve plunger 129 urged in one direction by a spring 201 and in the other direction by the pattern acting on the tracer disc 70. This plunger has an annular groove 130 which when the plunger is in a central neutral tracing position interconnects port 131 to port 131a, each port being half-way open. This is the maximum flow position for fluid coming through line 126 from the feed rate control valve 123 and passing out through port 131a into line 132. Line 132 is connected through the annular groove 133 of the valve plunger 93 of the table control valve 92 to the drain line 111. With this arrangement changes of contour in the pattern during the tracing operation will shift the valve plunger 129 to one side or the other of its control position, but regardless of which direction it is shifted, it will reduce the rate of flow through the valve and thereby reduce the feed rate of the table.

When the table reaches the end of its feeding stroke a dog on the table operates on the electrical circuit to deenergize solenoid 104, whereby the springs 103 automatically centralize the valve 102, thereby causing centralization of the table control valve 93 through the hydraulic connection described, thus stopping the table. The table remains stationary until the spindle carrier is retracted and indexed to its next upper position. A dog on the spindle carrier then operates on the electrical control circuit to energize solenoid 105 which shifts pilot valve plunger 102 to the right as viewed in Figure 12.

This connects fluid pressure from the line 100a through the annular groove 107, line 109 to chamber 94, thereby moving plunger 93 to the left. Discharge fluid from opposite chamber 95 flows through line 108, annular groove 134a of the valve plunger 102 into the drain line 111 for return to reservoir 90. This connects the pump 88 through the lines 91 and 91a, annular groove 112, line 116a to line 116, and also connects the auxiliary pump 98 through lines 100 and 100b, annular groove 135a in plunger 93, and line 116b to the line 116 so that both pumps now are supplying fluid pressure at large volume to the chamber 115 of the table cylinder 23 to effect a rapid return of the work table. At this time, fluid is being discharged from the chamber 114 through the line 113, annular groove 133 of the valve plunger 93 of the valve 92 into the drain line 111 for return to the reservoir 90. When the return movement is completed the solenoid 105 is deenergized, and the table valve 92 is again centralized in its stop position.

The indexing of the fixtures 27 and 28 in one direction or the other through 180 degrees to present either group A or B into cutting position is controlled by the spindle indexing control valve 134 having a plunger 135 which may be actuated by hydraulic pressure applied in the pressure chambers 136 and 137. When the slots of group A are being cut the valve plunger 135 is positioned to the left as shown in Figure 12, whereby the annular groove 138 connects fluid pressure from the line 91b to the line 139 connected to each of the table indexing cylinders 34 through the lines 139a so as to move and hold the indexing pistons 33 in their left hand position, Figures 6 and 12. Discharge from cylinders 34 passes out through the lines 140a into the line 140 which at this time is connected through the annular groove 141 in the valve plunger 135 to the drain line 111 for return to the reservoir 90.

When the plunger 135 of the control valve 134 is moved in the opposite direction, to the right, Figure 12, fluid pressure from the line 91b will then be connected through the annular groove 141 to the line 140 and through the lines 140a to the cylinders 34 so as to move the plungers 33 to the right and thereby rotate or index the work and pattern fixtures in a clockwise direction to bring the slots of group B into position for machining. Fluid at this time will be discharged from the cylinders 34 through the lines 139a into the line 139 which now is connected through the annular groove 137 in the valve plunger 135 to the drain line 111 for return to the reservoir 90.

The movement of the valve plunger 135 for indexing the fixtures to the group A position is accomplished by a cam actuating the plunger 142 of the group A indexing pilot valve 143 to the position shown in Figure 12, which connects fluid pressure from the pump 88 through lines 91 and 91c, annular groove 144 of the valve plunger 142 and line 145 to the pressure chamber 136 in the control valve 134. When it is desired to index the fixtures clockwise for positioning the work for machining group B slots, the valve plunger 142 is allowed to move down by its cam wherein line 145 is connected through the annular groove 144 to the drain line 111, while the group B indexing control valve 147 has its plunger 146 cam actuated to a position that fluid pressure from the line 91 and 91d, is connected through the annular groove 148 of the valve plunger 146 to the line 149 which is connected to the pressure chamber 137 of the control valve 134 so as to move the plunger 135 to the right. Thus, by appropriately actuating the valve plungers 142 and 146, the plunger 135 of the spindle indexing valve 134 may be hydraulically actuated to one position or the other so as to effect the indexing of the fixtures for presenting group A or group B slots into the cutting position.

Fluid pressure maintained behind the plungers 33 for holding the fixtures in indexed positions is also utilized to operate the fixtures F on the work platens 27. For instance, the fluid pressure in the line 139 passes through a check valve 151 into a line 152 which is appropriately connected to the fixture clamping control valves 153 so that these valves may be operated to connect fluid pressure from the line 152 through the annular groove 154 of each valve 153 to an appropriate supply line 155 connected to the fixtures to thereby clamp the work W. When the fixtures have been indexed in the opposite direction by application of the fluid pressure through the line 140, the fixtures F are still supplied with fluid pressure through a check valve 156 and the line 157. Thus, fluid pressure maintaining the work fixtures indexed in either direction also maintains the work properly gripped on the fixtures.

Means are provided to prevent feeding of the table unless all of the fixtures have fully indexed in either direction. This arrangement comprises means to maintain the solenoid 104 deenergized until the dogs 44 are in contact with the respective abutment blocks 39 or 40, Figure 6. This is accomplished by providing the dogs 44 with a projecting dog point 44a, Figure 3, which engages a push rod 158 carried in the support 31 which in turn engages a plunger 159 of serially connected shutoff valves 160. When the valve plungers 159 are depressed against the compression springs 161 a continuous connection of fluid pressure from the line 139 through the check valve 151 and the lines 162 and 163 will be established to the line 164. Pressure in the line 164 is connected to a pressure plunger 165 which actuates a limit switch 166 and through appropriate electric control means maintains the solenoid 104 energized, while if the dog is not in proper position, the solenoid will be deenergized.

Similarly, when the fixtures are indexed in a clockwise direction for machining the slots of group B, a second group of serially connected valves 167 will be similarly actuated by push rod 167a engaging plunger 167b as shown in Figure 5, to effect connection of fluid pressure from a line 168 and the interconnecting lines 169 between these valves to a line 170 connected to the pressure plunger 171 associated with the limit switch 172 so that when all of the spindles are indexed to proper position for cutting the slots of group B, pressure will be applied to the pressure plunger 171 to actuate a limit switch 172, causing energization of the feed solenoid 104. In the event, however, that one or more of the spindles have not fully indexed so as to bring the dog point 44a to a position to engage the push rod 167a and open one of the valves 167, the limit switch 172 will not be actuated, thereby preventing operation of the forward feeding movement of the work table 22. There has thus been provided an interlock arrangement for a series of indexable work and pattern supports which automatically prevents feeding movement of the work table carrying said supports in the event one or more of the supports have not been fully indexed.

The movement of the cross slide is hydraulically controlled by the tracer valve 69 which has an axially shiftable tracer valve plunger 129 which has a central neutral tracing position as previously stated. When the tracer valve plunger 129 is overdeflected, that is, moved beyond its neutral position towards the top of the sheet as viewed in Figure 12 the cross slide will move backward and when the tracer is undeflected—that is, moved toward the bottom of the sheet, as viewed in Figure 12, from its neutral position, the cross slide will move forward. In other words, the tracer valve plunger 129 is provided with a pair of annular grooves 174 and 175 for alternately connecting the pressure lines 91e and 91f with the lines 176 and 177 respectively which lead to a stop valve 178. The plunger 179 of this valve has annular grooves 180 and 181 which connect line 176 to a line 182 and line 177 to line 183. The line 183 is connected to the chamber 184 of the cylinder 50 while the line 182 is connected to the chamber 188 through check valve 200. A branch line leads to a variable feed control valve 184a and through a line 185 to a pressure reducing valve 186 which, in turn, is then connected through a line 187 directly to the chamber 188 of the cylinder 50.

At the start of the cycle with the cross slide retracted and the tracer free, the spring 201 will move the tracer valve to its undeflected position, whereby fluid pressure will flow from line 91f through the annular groove 175, line 177, annular groove 180 and line 183 to chamber 184 of the cross feed cylinder 50 which will cause advance of the cross slide. The fluid discharging from the other end of the cylinder will close check valve 200 and thus be forced through the line 187, valve 186, feed control valve 184a, line 182, annular groove 181 of the valve 179, line 176, and annular groove 174 to the drain line 111. As the forward movement of the slide takes place the plunger 189 of the valve 184a fixed on the base of the machine is actuated by a cam 190 carried on the cross slide 49 to throttle the discharge of fluid through the line 187 and thereby restrict or decrease the rate of feed as the cutters approach their forward working position. At the same time, the tracer disc 70 will engage the pattern and move the tracer valve back to its neutral position and stop the feed.

Means have been provided for automatically overdeflecting the tracer valve plunger 129 to effect retraction of the cross slide as at the end of a cycle comprising a slide control valve 191 having a plunger 192 which may be actuated through a suitable bell crank lever 193 by a pair of solenoids 194 and 195. When solenoid 194 is energized the valve plunger 192 will be axially moved so as to connect fluid pressure from the line 91g through the annular groove 196 to the line 197 connected to the pressure plunger 198 which actuates the tracer valve plunger 129 through a suitable lever 199 so as to move the plunger to overdeflected condition. When the solenoid 195 is energized, however, pressure from the line 91g is cut off from the pressure plunger 198 which is then connected to the drain line 111 so that the tracer valve plunger 129 under the influence of the compression spring 201 will move to its undeflected condition and thereby effect a forward movement of the cross slide.

The cross slide movement may be automatically stopped as at the point 77 in Figure 7 by downwardly shifting the plunger 179 of the cross slide blocking valve 178. This is accomplished by energizing the solenoid 202 of the pilot control valve 203. This valve 203 receives a supply of fluid pressure from the line 91 and when the solenoid 202 is deenergized the valve normally connects this pressure through an annular groove 204 to the line 206 connected to the pressure chamber 207 to hold the valve plunger 179 of the stop valve 178 in the position shown in Figure 12. Discharge from the chamber 210 passes through line 208, and annular groove 209 of valve plunger 205 to the drain line 111.

When the solenoid 202 is energized, its valve plunger 205 is so moved that pressure from the line 91 then passes through the annular groove 209 and the line 208 into the pressure chamber 210 of the valve 178 to thereby move its plunger 179 so as to block off the lines 182 and 183 and thereby arrest movement of the cross slide. Discharge at this time from the pressure chamber 207 of the valve 178 passes out through the line 206 through the annular groove 204 into the drain line 111 for return to the reservoir 90.

The spindle carrier actuating cylinder 56 for the cutter spindle carrier is controlled by means of a servo-valve 211, Figure 12, which is carried on the cross slide 49 directly above the spindle carrier 55 as indicated in Figure 1. This valve has an axially movable plunger 212 having a downwardly extending sleeve portion 213, the end of which engages the steps 214 formed on an index positioning drum 215 which is journaled on a suitable shaft 216 in a bracket 217, Figure 4, rigidly fixed to the spindle carrier 55. The plunger and sleeve have an axial bore through which passes a switch operating rod 213a, to be described later. This drum 215 is adapted to be driven through suitable gearing comprising a bevel gear 218 fixed on the shaft 216 and a mating bevel gear 219 appropriately journaled in the bracket 217 and driven through a universal joint 220, Figure 1, a drive shaft 221, and a universal joint 222 connected to the indexing control shaft 223 journaled in suitable bearings in the spindle carrier 55.

Vertical indexing movement of the spindle carrier 55 is controlled by a solenoid operated indexing valve 224 having a plunger 225 urged in one direction by a compression spring 226 and in the opposite direction by energizing the solenoid 227. Normally, when the solenoid 227 is deenergized, pressure supply from the line 91h is blocked at the valve 225 as shown in Figure 12. When the solenoid 227 is energized to effect indexing, fluid pressure is connected from the line 91h through the annular groove 228 of the valve plunger 225, and line 229 to chamber 230 of the detent plunger cylinder 231 causing withdrawal of detent plunger 232 from the detent wheel 233 fixed on the indexing shaft 223. This detent plunger 232 is thus moved back against the resistance of a compression spring 234 in the chamber 235 of cylinder 231, fluid being discharged from this chamber out through a line 236 through the annular groove 237 of the plunger 238 of a control valve 239 where it enters the drain line 150 for return to the reservoir 90.

When the detent plunger 232 is fully withdrawn, fluid pressure from the line 229 is connected to the line 240 and is thus transmitted to the pressure chamber 241 behind the ratchet plunger 242, this plunger having a suitable pawl adapted to successively engage the ratchet teeth 243 formed in the ratchet wheel 244 fixed on the indexing shaft 223. As pressure builds up in the chamber 241 the ratchet plunger 242 rotates the ratchet wheel 243 and shaft 223 one indexed position to bring the next step on the indexing drum 215 beneath the rod 213a and sleeve 213 of the servo-control valve 211. When the plunger 242 completes its movement, the plunger 238 of the control valve 239 is moved so that fluid pressure from line 91i connected to line 236 causes pressure to be applied in the chamber 235 to rapidly move the locking plunger 232 back into engagement with the detent disc 233.

As soon as the indexing has been completed and the solenoid 227 of the control valve 224 is deenergized, the valve plunger 225 will assume the position shown in Figure 12 wherein the chamber 230 of the detent plunger cylinder 231 is connected through the line 229 to the drain line 150 so that compression spring 245 may automatically return the ratchet plunger 242, the fluid being discharged from the pressure chamber 241 through the line 240 and the check valve 246 to the drain line 150. Thus, whenever solenoid 227 is energized, the shaft 223 of the indexing mechanism is indexed one position and when this solenoid is deenergized the apparatus is reset for another indexing movement.

Figure 10:
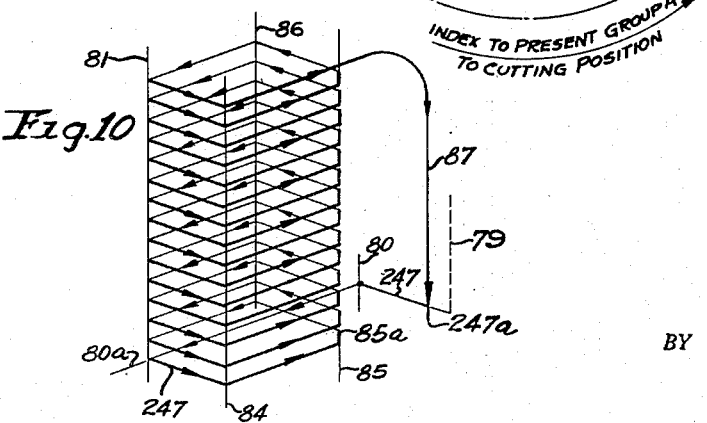
Figure 10 is a perspective three-dimensional diagram similar to Figure 8 but showing the path of relative travel of the cutters and work during the machining of the portions on the side of the work piece shown in Figure 9.

At the beginning of a machining cycle with the spindle carrier 55 in its lowest indexed position indicated at 247 in Figures 8 and 10, the sleeve 213 of the servo-valve plunger and the rod 213a will be on the highest step 214a of the indexing drum 215, and as the indexing takes place the drum will be rotated intermittently and the sleeve 213 will successively drop to the next lower step until the final bottom step 214b is reached. In this particular arrangement the indexing drum 215 is provided with two series of steps from the points 214a to 214b for group A and 214c to 214d for group B slots so that the sleeve 213 will pass through two complete intermittent dropping cycles for one complete revolution of the drum 215.

With the servo-valve plunger sleeve 213 on the step 214a, indexing of the drum 215 one position will momentarily cause the servo-valve plunger 212 to drop whereby pressure from the line 91 will be connected through the annular groove 247 and line 248 to the lower chamber 249 of cylinder 56 to cause the carrier to be raised to the next indexed position. The index drum, being mounted on the carrier, will move upward with it, thereby moving sleeve 213 and servo-valve plunger 212 to its neutral position, thus cutting off flow from the pressure line 91 to the cylinder 56. Fluid is discharged from the chamber 250 of the cylinder 56 through the line 251, the annular groove 252 of the servo-valve plunger 212 into the drain line 111. Thus, as the indexing shaft 233 is indexed by appropriately energizing solenoid 227 of the indexing valve 224, the servo-valve 211 will each time be momentarily unbalanced until the spindle carrier 55 has moved up to the next desired index position, this process continuing until all of the steps 214 on the drum 215 have been passed over and the sleeve 213 of the servo-valve finally arrives at the last step 214b, this condition occurring after a half revolution of the drum 215 for group A slots and being repeated during the second half revolution of the drum for the slots of group B.

As the last index position 214b or 214d is reached, a cam 253, Figure 12, fixed on the indexing shaft 223, actuates the plunger 254 of a control valve 255 so as to connect pressure from the line 91d to the line 256. This line is connected to the pressure plunger 257 which through suitable leverage arrangement 258 lifts the plunger 212 of the servo-valve 211 upwardly, to its reverse position so that now pressure from the line 91 is connected through the annular groove 252 to the line 251 which communicates with the upper chamber 250 of the cylinder 56 to thereby rapidly move the cutter spindle carrier downwardly. At this time fluid is discharged from the lower chamber 249 of the cylinder 56 out through the line 248, annular groove 247 into the interconnecting line 259 which is at all times connected to the drain line 111. Thus, after the indexing movement for the last slot and a further final indexing of the shaft 223 takes place, the cam 253 actuates the valve plunger 254 to effect the downward return of the cutter spindle carrier to its starting position 247 indicated in Figures 8 and 10.

Figure 11:
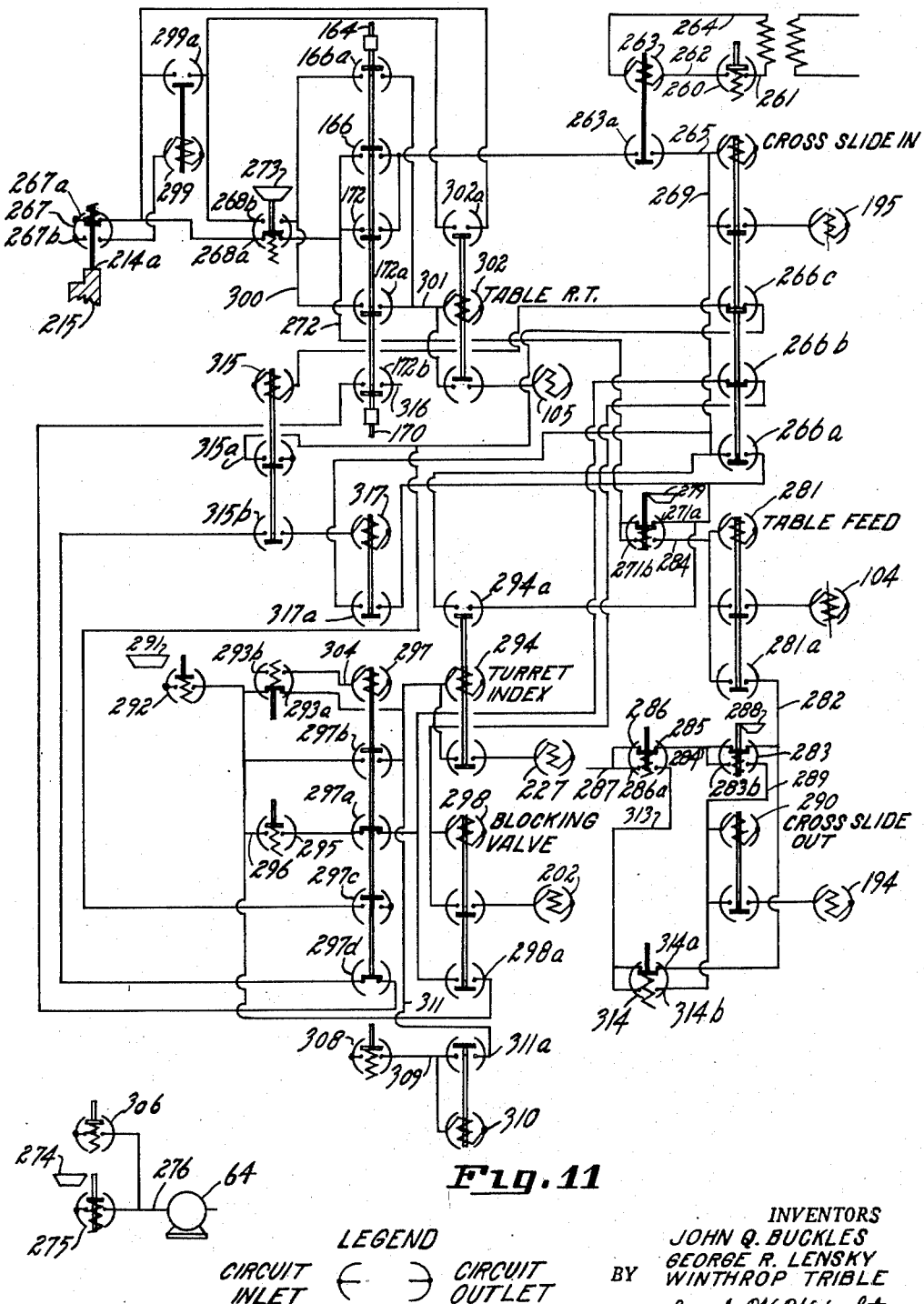
Figure 11 is an elementary wiring diagram of the electric control circuit of the machine.

With the fluid pressure pumps 88 and 98 operating and delivering fluid pressure to the lines 91 and 100, Figure 12, the work cycle of the machine is started by operating the manual push button switch 260, Figure 11, to complete a circuit from lead 261 through the switch 260, line 262, and relay 263 to power main 264. The relay closes contacts 263a in a circuit 265 to energize relay 266 which controls operation of the solenoid 195 which causes shifting of the pilot valve plunger 192 shown in Figure 12 into a position to release the tracer valve 69 and thus cause inward movement of the cross slide 49. The circuit 265 is completed from line 261 through limit switch contacts 267a, 268a, 166, contacts 263a and relay 266 to power main 264.

It will be noted that in the circuit 265 the pressure limit switches 166 and 172 operated by the work fixture are connected in parallel in this starting circuit so that one or the other must be closed in order to start the machine, and it is assumed that switch 166 is so closed.

Since the contacts 263a will open upon release of the push button, the relay 266 latches itself in through a latching circuit comprising line 269, latching relay contacts 266a of relay 266, line 270, normally closed switch contacts 271a, line 272 to closed limit switch contacts 268a. The result is forward movement of the cross slide 49 from its starting position 71, Figure 7, along the line 72. Attention is invited to the fact that a dog 273 on the table, as shown in Figure 1, is holding the switch 268 closed as shown in Figure 11 when the table is in its starting position. It is also to be noted that the step 214a on the turret 215 not only supports the sleeve 213 of the servo-valve but also the operating rod 213a for switch 267 and in such position as to close the contacts 267a as shown in Figures 4A and 11. The rod and sleeve, although telescoping one another, are separate independent parts. This positions the cutters and tracer disc vertically for machining the first slot in group A, the servo-valve being in a position to hold the piston 57 against movement.

When the cross slide 49 is in its starting position 71, a dog 274 holds limit switch 275 open as shown in Figures 2 and 11.

As soon as the cross slide advances, the dog 274 moves off of limit switch 275 which closes and completes a circuit from power main 261 through line 276 to the spindle motors 64 which start rotation of the cutters.

Also in the starting position of the machine, the index shaft 223 positions a cam 277 fixed on the shaft to hold the plunger 142 of the group A work and pattern spindle indexing control valve 143 in the position shown in Figure 12 to apply fluid pressure to one end of valve 134 and thus connect pressure to the cylinders 34 to actuate the index plungers 33 in a direction to hold the fixtures 27 and 28 in position for machining the slots of group A, thus closing interlock switch 166.

A second cam 278 also fixed on the shaft 223 holds the plunger 146 of the group B work and pattern spindle indexing control valve 147 in position to connect the left hand end of valve 134 to reservoir. Fluid from cylinders 34 discharges through line 140, and valve 134 to reservoir through line 111.

The cross slide 49 advances along the line 72 in Figure 7 to the position 74 at which time a dog 279 on the cross slide engages the limit switch 271 which, as shown in Figure 11, opens contacts 271a to break the circuit to the cross slide solenoid 195 and closes a circuit through contacts 271b and line 284 to relay 281 which causes actuation of the table pilot valve solenoid 104. This relay carries contacts 281a which close to complete a latching circuit through line 282, closed contacts 283a of limit switch 283, line 284, closed contacts 285 of limit switch 286 and line 287 to the power main 261. It is necessary to set up this latching circuit because as soon as the table starts to feed due to the operation of solenoid 104, the dog 273 carried by the table moves out of engagement with the limit switch 268 opening contacts 268a which breaks the circuit to limit switch 271, and closes contacts 268b which is ineffective at this time but which is in a circuit to eventually cause operation of the rapid traverse solenoid 105.

It will be noted that the table will not start feeding movement to the left in spite of operation of solenoid 104 until the tracer disc 70 engages the pattern and moves the tracer valve plunger back to its normal tracing position which establishes interconnection between table feed lines 131 and 132. Discharge from the table cylinder 23 is then controlled by the feed approach throttle valves 117 and 123 so that initially the table feeds slowly until the cutters have engaged the work, and then ultimately the table increases to the full desired feed rate to complete the machining of the slots.

When the work table 22 has completed cutting the first slot in group A and the cutters and tracer reach the point 76 on the diagram in Figure 7, a dog 288 on the table actuates limit switch 283 to open contacts 283a, thereby breaking the latching circuit to table feed solenoid 104 which permits table pilot valve 101 to automatically centralize and thereby stop the table feed; and closes contacts 283b which completes a circuit from power main 261 through line 287, closed contacts 285, line 284, closed contacts 283b, line 289 to relay 290 which causes operation of solenoid 194 and shifting of cross slide pilot valve 191. This causes withdrawal of the tracer plunger 129 away from the pattern array to effect withdrawal of the cross slide.

As the cross slide 49 moves backward from the position 76, a dog 291 on the cross slide depresses limit switch 292 which, as shown in Figure 11, completes a circuit from power main 261 through limit switch 292 closed contacts 293a of limit switch 293 to index relay 294. This relay controls operation of the turret index control solenoid 227. Operation of this relay closes contacts 295 in a branch circuit 296 supplied through limit switch 292, thereby completing a circuit through normally closed contacts 297a of a relay 297 to relay 298 which governs the operation of the cross slide blocking valve solenoid 202. The cross slide is thus stopped at the point 77 and the hydraulic indexing of the turret 215 takes place.

The turret 215 rotates in a direction as viewed in Figure 12 to move the step 214a to the right whereby the sleeve 213 and connected servovalve 212 drop to cause an upward indexing of the spindle carrier to a position to cut the next slot in group A. At the same time, the rod 213a drops to permit the limit switch 267 in Figure 11 to open contacts 267a and close 267b, completing a circuit through a timer relay 299. Operation of this relay closes its contacts 299a which are in a circuit with contacts 267a of the limit switch 267. Thus, when the indexing operation of the spindle carrier 55 is completed, the next step on the turret will raise the rod 213a and close the switch 267a and complete a circuit through closed contacts 299a, closed contacts 268b, line 300, fixture closed limit switch contacts 166a, and line 301 to rapid traverse relay 302. This relay controls the operation of the table rapid traverse solenoid 105 whereby the valve 102 is now shifted to the right to effect rapid traverse return of the table. At the same time the relay 302 closes contacts 302a to latch itself in across the timer relay contacts 299a, because these contacts are due to automatically open after a time delay due to the breaking of the circuit to the timer relay 299 by the opening of contacts 267b.

When the work table 22 completes its rapid return movement to the starting position with the cutters and tracer disc in a position corresponding to point 78 in Figure 7, the dog 273 on the table actuates the limit switch 268 which breaks the circuit to line 300 and relay 302, thereby deenergizing the solenoid 105 and again permitting the pilot valve 101 to automatically assume its neutral position, thus centralizing valve 92 to arrest movement of the work table. Attention is invited to the fact that when the cross slide moved out of its cutting position it released the limit switch 271 which had been held closed by dog 279 during the cutting, thereby closing contacts 271a, and that another dog became effective at position 77 to close the limit switch 292, completing the circuit to the turret index control relay 294, and that the parts have remained in this position during the rapid traverse return of the table. The index relay 294 at the time that it was operated closed a pair of contacts 294a to complete a circuit from the closed contacts 271a of limit switch 271, lines 270 and 269 to the control relay 266 for the cross slide control solenoid 195. Thus, when the limit switch 268 was actuated by the table dog 273 at the end of the rapid traverse return of the table it completed a circuit from main 261 through closed contact 267a of limit switch 267 and closed contacts 268a of limit switch 268 and line 272 to the closed contacts 271a of limit switch 271 whereby the solenoid 195 is again energized. Simultaneously, the operation of relay 266 opened the normally closed contacts 266b, releasing the blocking valve relay 298 whereby the blocking valve opens to start a new cycle to cut the next slot in group A.

The cross slide thus moves forward from the position 78 to the position 74 in Figure 7. At the start of this movement the dog on the cross slide released limit switch 292, thereby breaking the circuit to the relays 294 and 298 for the index solenoid 227 and block valve solenoid 202 respectively. Since the relay 294 becomes deenergized its contacts 294a open in the circuit to the cross slide relay 266, but as soon as this relay was energized it latched itself in through the closing of contacts 266a connected in parallel across the contacts 294a.

The above-described cycle of events repeats until the last slot in group A has been completed. However, as the indexing shaft 223 rotates to index the spindle carrier from the next to last slot to the last slot to be cut in group A, a dog on the cross slide actuates limit switch 292 as before to cause operation of the turret index relay 294 and the blocking valve relay 298. The blocking valve relay immediately latches itself in by closing contacts 298a so that it is unaffected by the rest of the circuit. When the indexible shaft 223 completes this particular index rotation, a cam 303 fixed on the indexing shaft actuates limit switch 293, opening contacts 293a and closing contacts 293b which completes a circuit from power main 261 through line 304 to control relay 297. Operation of relay 297 closes its normally open contacts 297b and opens its normally closed contacts 297a, thereby completing a circuit around the recently opened contacts 293a of limit switch 293 but unaffecting the circuit to the blocking valve control relay 298 because this was latched in through the closing of contacts 298a. Although the circuit to control relay 294 was momentarily broken, it happens so quickly that it is impossible to effect a second indexing through the hydraulic indexing circuit.

The indexing operation at this time will continue in the usual manner and the cross slide will eventually advance to cut the last slot in group A. The object of operating the limit switch 293 at this time is to set up the circuit to prevent operation of the blocking valve upon the final retraction of the cross slide so that the cross slide will not be stopped by the blocking valve but will return to its extreme outward position. This is accomplished by opening the normally closed contacts 297a so that upon closing of the contacts 295 during the next return movement of the cross slide a circuit will not be completed to the blocking valve control relay 298, and the cross slide will continue to its extreme outward position. It will thus be seen that upon completion of the last slot in group A that the circuit is so conditioned by the closing of contacts 297b that during the return movement of the cross slide the limit switch 292 may close the circuit to the turret index relay 294 a sufficient length of time to effect an indexing of the turret without operating the blocking valve.

Due to the fact that the surface 214b on the index drum 215 is provided with two steps of equal height at this point the shaft 223 indexes another position after cutting the last slot in group A, without moving the servo-valve or operating the switch 267. The indexing of the shaft 223 at this time, however, causes the cam 253 fixed on the shaft to actuate the valve plunger 254 on the latch-up valve 255 for the servo-valve 211 so as to shift the servo-valve plunger 212 upward independent of rod 213a to cause return downward movement of the spindle carrier and the turret drum 215 carried thereby. As soon as the turret 215 moves downward, the limit switch operating rod 213a is free to drop and thereby open the limit switch 267, or in other words open the contacts 267a and close the contacts 267b.

This will cause operation of the timer relay 299, closing contacts 299a, but the circuit will still be open at the limit switch 268 because the table has not yet returned, the tracer and cutter being in the position indicated by the point 79 in Figure 7. Another cam 305 is simultaneously indexed by the shaft 223 at this time to close limit switch 306 to maintain the circuit to the spindle motors 64 because of the opening of limit switch 275 by dog 274 due to the cross slide returning to its extreme outward position.

Thus, the last slot in group A is completed, the cross slide moved back, and in passing through the position 77 an index operation was effected which caused return downward movement of the spindle carrier.

During the downward movement of the spindle carrier, a dog 307 on the cross slide trips a limit switch 308 carried by the spindle carrier closing a circuit 309 to a relay 310. The operation of this relay closes contacts 310a to complete a branch circuit 311 to index relay 294. Thus, downward movement of the spindle carrier effects another indexing operation of the turret 215 while the cross slide is still back. This brings the highest step 214c of the indexing drum 215 beneath the rod 213a of the limit switch 267 but the rod is still hanging free. This same index movement of the shaft 223 causes the cam 253 to release the pilot valve 255, whereby the spring-actuated bell crank 258 may return the servo-valve to such a position that it will cause the spindle carrier to move upward and thus effect engagement of the highest step 214c on the indexing drum 215 with the rod 213a and the servo-valve sleeve 213 to position the cutters and tracer vertically for cutting the first slot of group B. By this same indexing movement a cam 312 on the shaft 223 actuates the limit switch 286 opening contacts 285 and closing contacts 286a, thereby transferring the circuit 287 from line 284 to line 313. The circuit 313 leads to the limit switch 314 which is mounted on the front of the bed as shown in Figure 1 for controlling the new length of table movement in cutting the slots of group B.

In addition, the indexing movement of the shaft 223 causes cam 277 to actuate valve plunger 142 of the work and pattern fixture indexing valve 143 while at the same time cam 278 actuates valve plunger 146 of the fixture indexing valve 147 to thus shift the work fixture indexing control valve 134 to effect clockwise indexing of the work and pattern fixtures to position the slots of group B opposite the cutters. When all of the fixtures 27 and 28 have rotated to their full indexed position and shifted all of the valves 167 in the manner previously described, the pressure switch 172 will close and switch 166 will open. The contacts 172a of switch 172, it will be noted, are in the circuit with the table rapid traverse control relay 302 whereby if all of the work fixtures are not fully indexed this relay will not be operated.

It will thus be noted that this last indexing movement of the shaft 223 was for the purpose of positioning the parts to start the cutting of the slots in group B and caused indexing of the work fixtures with the resultant closing of the interlock limit switch 172, transfer of the circuit from table limit switch 283 to table limit switch 314, and upward indexing of the spindle carriers which caused operation of limit switch 267 by opening contacts 267b and closing contacts 267a. Since the timer relay had previously closed contacts 299a and since the limit switch 268 is still released, closing contacts 268b, a circuit is completed through line 300, limit switch contacts 172a to the table rapid traverse control relay 302 which is now actuated to cause operation of solenoid 105 and thereby through the hydraulic circuit to effect rapid return movement of the table.

This movement is stopped when the dog 273 on the table actuates limit switch 268 and opens contacts 268b, breaking the circuit so as to release solenoid 105 and permit the pivot valve 101 to automatically centralize and lock the table in a stop position.

It is to be noted that when the limit switch 293 was actuated to condition the circuit for preventing operation of the blocking valve after all of the slots in group A were cut, that the relay 297, which was energized at that time, closed a pair of contacts 297c to close a circuit from the power main 261 through a pair of normally closed contacts 266c of relay 266 to a relay 315. This relay carries a pair of contacts 315a which close to latch the relay in around contacts 297c. The relay 315 also closes another pair of contacts 315b in a circuit 316 containing contacts 172b, normally closed contacts 297d and 315b to relay 317.

The resulting operation is that the limit switch 293 was released by its cam during the last index operation which positioned the parts for cutting slots in group B, thus opening contacts 293b and deenergizing relay 297. This caused the contacts 297c to open in the circuit to relay 315 but this relay was latched in by its closed contacts 315a and since the cross slide is still in a return position the relay 266 is deenergized so that the normal closed contacts 266c are still closed. In the circuit 316 contacts 315b are closed due to the energization of relay 315, the contacts 297d are closed due to the deenergization of relay 297, and the contacts 172b are closed due to the completion of the indexing of the work fixtures to a position for cutting the slots of group B. Thus, relay 317 is energized.

This relay carries a pair of contacts 317a which are thus closed to complete a circuit from line 270 to line 269 and thereby to cross slide relay 266. The above-described operation, whereby the contacts 317a were closed, occurred before the table started its return rapid traverse movement whereby upon completion of its return movement and operation of limit switch 268 by dog 273 a circuit was completed through closed contacts 267a of limit switch 267, closed contacts 268a of limit switch 268, line 272, closed contacts 271a of limit switch 271, line 270, closed contacts 317a, line 269 to cross slide relay 266. Thus, the completion of the return movement of the table after the cutting of slots in group A caused deenergization of the rapid traverse solenoid 105 and the completion of the circuit to the cross slide solenoid 195 whereby the cross slide starts to move in to cut the first slot in group B. The energization of the relay 266 to cause operation of the solenoid 195 immediately closed contacts 266a whereby the relay 266 became latched in.

As soon as relay 266 was energized it opened contacts 266c in the circuit of solenoid 315 whereby the relay became deenergized and opened contacts 315b in circuit of relay 317, thereby deenergizing that relay and opening contacts 317a in the circuit to the cross slide solenoid 266. Thus, these circuits are released and ready for the next cycle.

The cross slide is now in position 80 indicated on the diagram in Figure 9, and the work fixtures are indexed to a position to present the group B slots to the cutters. The cross slide then moves forward along the line 80a to the position 81, and the table is automatically caused to feed in the direction of arrow 75b. In this portion of the cycle, as previously mentioned, the length of movement of the table is controlled by the limit switch 314 which is operated by a separate dog 318 carried by the table. The limit switch 314 has a first pair of contacts 314a which are closed at the beginning of the cycle to establish a circuit through line 282 to the table feed control relay 281. When the feed movement is ended, the limit switch 314 is operated by the dog 318 to close contacts 314b to complete a circuit to the cross slide relay 290 which functions in the same manner as before.

The remainder of the cutting cycle takes place as in the case of group A but with the limit switch 314 defining a shorter feed stroke for the work table 22. After the final slot is completed in group B and the spindle carrier 55 returns downward along the line 87, the limit switch 308 on the spindle carrier 55 is again operated by the dog 307 causing index of the shaft 223 to again bring the high step 214a in the group A series of steps on the indexing drum 215 into position under the sleeve 213 of the servo-valve 211. This indexing of the shaft 223 actuates valve 255 to release the servo-valve plunger 212 to allow the spindle carrier to move upward from the position 247a to position 247, Figure 10, to bring the high step 214a into engagement with the rod 213 and thereby position the spindle carrier for cutting the first slot in group A and at the same time closed limit switch 267. The work fixtures would be indexed again back to the position for cutting slots A which would open interlock limit switch 172 and close interlock limit switch 166. Since the limit switch 172 is now released, its contacts 172b will be open whereby the relay 317 will be deenergized, thus leaving its contacts 317a in the circuit to the cross slide relay 266 open whereby upon the last rapid traverse return of the table after cutting the slots in group B and indexing the fixtures for group A, the dog 273 in operating limit switch 268 and closing contacts 268a would not complete a circuit to the cross slide relay 266 whereby the machine would stop. It would then be necessary for the operator to push the button 260 to start the next cycle of the machine. It is also to be noted that when the cross slide returned to its extreme outer position after cutting the slots in group B, the limit switch 306 will not be closed by its cam so that the dog 274 in opening the limit switch 275 will stop operation of the spindle motors. The finished work pieces may now be removed from the fixtures and the machine reloaded with unfinished work pieces.

What is claimed is:

1. In a pattern controlled machine tool, a reciprocable work table, indexible work and pattern fixtures mounted on said table, a cutting tool spindle supported for lateral movement toward and from the index axis of the work fixtures, pattern controlled means including a tracer engageable with a pattern array mounted on the pattern fixture to control lateral movement of the tool spindle during a cutting operation, means for indexing said tool spindle axially to position the cutter successively in a series of predetermined cutting planes, and means responsive to movement of the tool spindle to the last cutting plane of a series to effect indexing of the work and pattern fixtures.

2. In a pattern controlled machine tool having a reciprocable work table, power operable means for feeding the table in one direction and rapid traversing the table in a return direction, work and pattern fixtures indexibly journaled on said work table, a tracer controlled cutting tool operably related to the work fixtures to effect a cutting operation on the work during feeding movement of the table, power operable means for indexing said fixtures, and means automatically responsive to the indexing of said fixtures to change the length of the feeding stroke of said table.

3. In a pattern controlled milling machine having a frame, a work table reciprocably mounted on said frame, power operable means for feeding the table in one direction and rapid traversing the table in the other direction, indexible work and pattern fixtures journaled on said work table, a cutting means supported for movement toward and from said work fixtures, tracer control means including a tracer for cooperating with pattern means on said pattern fixture to vary the relative movement between said cutting means and work fixture, means for indexing said cutting means to a plurality of predetermined cutting planes, means responsive to indexing of said cutting means to its last cutting plane to effect indexing of said work and pattern fixtures, and means responsive to said indexing movements to automatically vary the length of the table stroke.

4. In a pattern controlled milling machine having a frame, a work table reciprocably mounted on said frame, a plurality of work and pattern fixtures indexibly mounted on said work table, a rotatable cutter and tracer means associated with the respective fixtures for machining a series of profiled surfaces on the work carried by the work fixtures during movement of said work table, said pattern fixture carrying a series of patterns for controlling the contour of each surface to be cut, individual fluid pressure operated means for indexing said fixtures to present new work surfaces and a new pattern array to said cutter and tracer means, and hydraulic control means effective to prevent operation of the machine during the indexing operation.

5. In a pattern controlled milling machine, a frame, a work table reciprocably mounted on said frame, a plurality of work and pattern fixtures indexibly journaled on said work table, a cross slide supported on said frame for movement normal to the direction of movement of said work table, a tool spindle carrier mounted on said cross slide for movement parallel to the index axes of said fixtures, tool spindles individual to each work fixture journaled on said carrier, a prime mover mounted on said carrier for rotating said tool spindles, tracer controlled means mounted on said carrier for operative engagement with pattern means carried by the pattern fixture, means to oscillatably index said fixtures through a semi-circle, means to change the length of movement of the work table after each indexing operation, and means controlled by the work table to effect retraction of the cross slide and indexing of the tool carrier after each cutting operation.

6. In a pattern controlled milling machine, a frame, a work table reciprocably mounted on said frame, a plurality of work and pattern fixtures indexibly journaled on said work table, a cross slide supported on said frame for movement normal to the direction of movement of said work table, a tool spindle carrier mounted on said cross slide for movement parallel to the index axes of said fixtures, tool spindles individual to each work fixture journaled on said carrier, a prime mover mounted on said carrier for rotating said tool spindles, tracer controlled means mounted on said carrier for operative engagement with pattern means carried by the pattern fixture, means to oscillatably index said fixtures through a semi-circle, means to change the length of movement of the work table after each indexing operation, means controlled by the work table to effect retraction of the cross slide and indexing of the tool carrier after each cutting operation, and interlock means to prevent movement of the table and cross slide during indexing of said work and pattern fixtures.

7. In a pattern controlled milling machine having a reciprocable work table, a plurality of work and pattern fixtures indexibly journaled on said work table, means for rotating and holding said fixtures in one of either indexible positions, a tool carrier supported for movement in two directions in a plane normal to the axis of the movement of the work table, a tracer control means mounted on said carrier and engageable with a pattern on said pattern fixture for controlling the movement of said carrier toward and from the work and pattern fixtures, means responsive to engagement of the tracer with pattern means to initiate a feeding movement of the work table, means operable by movement of the work table for retracting the tool carrier at the end of a feeding stroke to an intermediate position, means responsive to movement of the tool carrier to said intermediate position to effect indexing of the tool carrier parallel to the index axes of said fixtures to position the parts in a new cutting plane, means responsive to said indexing means to effect rapid return of the work table to its starting position, and trip means operated by the table upon its return to advance said carrier to a cutting position to begin another cycle.

8. In a pattern controlled milling machine having a reciprocable work table, a plurality of work and pattern fixtures indexibly journaled on said work table, means for rotating and holding said fixtures in one of either indexible positions, a tool carrier supported for movement in two directions in a plane normal to the axis of the movement of the work table, a tracer control means mounted on said carrier and engageable with a pattern on said pattern fixture for controlling the movement of said carrier toward and from the work and pattern fixtures, means responsive to engagement of the tracer with pattern means to initiate a feeding movement of the work table, means operable by movement of the work table for retracting the tool carrier at the end of a feeding stroke to an intermediate position, means responsive to movement of the tool carrier to said intermediate position to effect indexing of the tool carrier parallel to the index axes of said fixtures to position the parts in a new cutting plane, means responsive to said indexing means to effect rapid return of the work table to its starting position, trip means operated by the table upon its return to advance said carrier to a cutting position to begin another cycle, and means responsive to indexing of the tool carrier to the last of a series of predetermined positions to effect full withdrawal of the tool carrier and automatic indexing of said work and pattern fixtures.

9. In a pattern controlled milling machine having a reciprocable work table, a plurality of work and pattern fixtures indexibly journaled on said table, a tool spindle carrier supported for movement in two directions in a plane normal to the direction of movement of said table, a tracer control means carried by said carrier including a tracer engageable with pattern means on said pattern fixture for controlling a cutter carried by the tool spindle relative to the work during feeding movement of the table in one direction, means operated by engagement of the tracer with the pattern to initiate feeding movement of the work table, means controlled by the table to effect withdrawal of the tool carrier to an intermediate position at the end of the table feeding stroke, means responsive to movement of the tool carrier to its intermediate position to effect indexing of the tool spindle carrier in a direction parallel to the axes of the work and pattern fixtures, said indexing means causing return of the work table to a starting position, and trip means operated by the table upon return to its starting position to advance the tool carrier for a second cutting operation.

10. In a pattern controlled machine tool having a reciprocable slide for supporting a work piece and pattern means, and a tool support carrying a metal working tool and a tracer, the combination of power operable means for effecting advance and retractive movements of the tool support relative to a cutting position in which the tracer engages said pattern means, fluid operable means for reciprocating said slide, means responsive to engagement of the tracer with the pattern for connecting a source of pressure to said fluid operable means, trip operable means for stopping the movement of said slide, means simultaneously operable by said trip means to effect retraction of the tool support, and means actuated by the retracting support to effect indexing of said tool support normal to its direction of advance and retraction.

11. In a pattern controlled machine tool having a work table, means to support a plurality of work pieces and pattern means on said work table, a cross slide movable normal to the direction of movement of the work table, a cutter spindle carried by said slide, a slotting cutter attached to said spindle for rotation in a plane parallel to the plane of said work table, a tracer carried by said cross slide for engagement with said pattern means upon advance of the cross slide, means responsive to engagement of the tracer for causing actuation of the work table and the cutting of a slot in the work piece to a depth determined by said pattern, trip operable means for stopping the table and effecting retraction of the cross slide, and means automatically operable by the retracting cross slide to effect indexing of the cutter to a second plane preparatory to cutting a second slot in the work.

12. In a pattern controlled machine tool having a reciprocating work support and a cross slide movable normally to the direction of movement of the work support, the combination of a tracer mounted on said cross slide for engagement with a pattern on the work support, a tracer controlled valve for controlling reciprocation of the cross slide, power operable means for holding the tracer valve in a position to cause retraction of the cross slide, manually controlled power operable means for releasing said first-named power operable means, resiliently operable means for automatically positioning the tracer to cause advance of the cross slide, trip means operable by the cross slide to potentially connect a source of power for feeding the work support, and means controlled by the tracer valve upon engagement of the tracer with the pattern to institute said feeding movement.

13. In a pattern controlled machine tool having a work support and a tool support, a tracer carried by the tool support and a pattern array carried by the work support, the combination of transmission and control means for effecting relative movement between the supports to pattern control mill a series of profile surfaces in succession on one side of a work piece, means automatically responsive to completion of said series of surfaces to index the work and pattern array to present the opposite side of the work to the cutting means, and means responsive to completion of said indexing movement to cause said transmission and control means to pattern control mill a second series of profile surfaces on the opposite side of said work.

14. In a pattern controlled machine tool having a work support and a tool support, a tracer carried by the tool support and a plurality of pattern means carried by the work support, the combination of an automatic power operated cycle control mechanism for effecting relative movement between said supports in a manner to cut a series of varying profile surfaces longitudinally of the work, means for determining when said series of surfaces have been cut, said means causing indexing of the work and the presentation of a new series of pattern surfaces to the tracer, and means responsive to completion of said indexing to initiate operation of said automatic cycle control mechanism to mill a second series of profile surfaces on the work longitudinally thereof and in accordance with the new set of patterns.

15. In a pattern controlled machine tool having a work supporting table and a tool supporting slide movable normally thereto and a tracer carried by said slide for engagement with pattern means mounted on the work table, the combination of power operable means for reciprocating said work table through a definite length of stroke, automatic cycle control mechanism for causing engagement of the tracer with the pattern means and reciprocation of the work table through a number of cycles to cut a plurality of profile surfaces on the work, means automatically operable for indexing said work after completion of said series to present another side of the work to said tool slide, and means automatically effective upon completion of said indexing movement to change the length of said table stroke and initiate operation of said cycle control mechanism to cut a second series of profiled surfaces on the work.

16. In a pattern controlled machine tool having a work support and a tool support and a tracer control mechanism mounted on said tool support for engagement with pattern means mounted on the work support, said mechanism including a tracer control valve, the combination of fluid operable means for retracting said tracer valve, electrically operated control means for said power operable means including a starting button for effecting release of said tracer valve, means responsive to release of the tracer valve for causing the tool slide to effect engagement of the tracer with the pattern means, power operable means for shifting the work support, electrical control means for starting and stopping said last-named power operable means, said electrical control means including a trip operable switch actuable by the advancing tool support for causing feeding of the work support upon engagement of the tracer with the pattern.

17. In a pattern controlled machine tool having a longitudinally reciprocable work support, a cross slide movable toward and from said support, a tool carrier supporting a tool mounted on the cross slide for movement normal to the plane of movement of said support and cross slide, and an automatic tracer controlled mechanism mounted on the carrier for controlling movement of the cross slide, the combination of transmission and control mechanism for causing relative movement between the tool and work support to automatically machine a series of spaced profile work surfaces in a single automatic cycle including advance and retraction control relays operatively connected to the tracer, a push button for energizing said advance relay, feed and rapid traverse control relays for the work support, said advancing cross slide causing engagement of the tracer with a pattern means carried by the work support and simultaneously energizing said feed control relay whereby during subsequent feeding of the table the tracer will control the shape of the profile surface, means operable by the work support for energizing said retraction control relay, means for indexing said carrier including an index control relay, means operable by the retracting cross slide to energize the index relay, a secondary circuit closed by said index relay for energizing a stop control relay which is operatively connected for stopping the cross slide, means responsive to completion of the indexing to energize said rapid traverse control relay and effect return of the work support, means actuated by the returning work support to energize said advance control relay and deenergize the stop control relay to cause a second advance of the cross slide, and means responsive to the advancing movement of the cross slide to deenergize the indexing relay whereby subsequent profiled surfaces will be machined in automatic succession.

18. In a pattern controlled machine tool having a longitudinally reciprocable work support, a cross slide movable toward and from the work support, a tool carrier mounted on the cross slide for movement normal to the plane of movement of the table and cross slide and an automatic tracer control mechanism mounted on the carrier for controlling the cross slide, the combination of transmission and control mechanism for controlling movement of the parts including an advance and retraction control relay for the tracer, a manually controlled push button for energizing said advance relay to cause advance of the cross slide to move the tracer into engagement with a pattern means carried by the work support, means responsive to tracer engagement for subsequently controlling the position of the cross slide in accordance with said pattern means, power operable means for feeding the table including a feed control relay, and switch means in circuit with said feed control relay and operable by the cross slide simultaneously with engagement of the tracer with the pattern means for initiating a feeding movement of the work support.

19. In a pattern controlled machine tool having a power operated work support, a power operated tool slide carrying a tool support movable normal to the direction of movement of the work support and a tracer control mechanism carried by the tool slide including a tracer in engagement with pattern means on the work support for controlling the movement of the cross slide, the com- bination of means for effecting retraction of the cross slide at the end of a profiling operation including a control relay, switch means in circuit with said relay and operable by the table for energizing said relay, means operated by the relay for automatically retracting the tracer to effect retraction of the cross slide, a stop control interposed between the tracer and the power operable means for the cross slide, a control relay for said control, means to energize said last-named relay from the retracting cross slide to stop it in some intermediate position, and means simultaneously operable with said last-named means to effect indexing of the tool support normal to the plane of movement of the table and cross slide to effect automatic repositioning of the parts preparatory to machining a second profile surface on the work.

20. In a pattern controlled machine tool having a longitudinally reciprocable work support, a cross slide movable toward and from the work support, a tool carrier mounted on the cross slide for indexing movement normal to the plane of movement of the table and cross slide, a cutting tool mounted on the carrier, and a tracer mounted on the carrier in engagement with pattern means on the work support for controlling a profiling operation on the work during relative feeding movement between the work support and the cross slide, the combination of means for effecting relative separation of the tracer and cutter relative to the pattern and work at the end of a feeding movement including a control relay operatively connected to effect retraction of the tracer, means operable by the work support for energizing said relay, an indexing mechanism for the tool carrier, means trip operable by the retracting cross slide to effect actuation of said indexing mechanism, a second control relay for the cross slide operatively connected for releasing said tracer, a control relay for causing rapid return movement of the table, a selector switch for said second relay and said rapid return relay normally held in a position to connect said rapid traverse relay to a pilot switch in said indexing mechanism, said indexing mechanism being operable to open and close said pilot switch at the beginning and end of an index cycle, means responsive to said opening and closing to complete a circuit from the pilot switch through said selector switch to the rapid traverse control relay to cause return movement of the table, and means carried by the table for operating said selector switch to stop the rapid traverse movement and energize said second relay to cause movement of the tool and tracer toward the work support.

21. In a pattern controlled machine tool having a work support and a tool support and a tracer mechanism mounted on the tool support including a tracer for engaging a pattern on the work support and power operable means for feeding said supports, the combination of a tracer valve having a first position for causing feeding of the table, a second position for effecting retraction of the cross slide and a third position for causing advance of the cross slide, fluid operable means for holding the tracer in its second position, electrically operable means including a starting button for releasing said fluid operable means, means normally urging the tracer to its third position, electrical trip means operable by the cross slide for potentially connecting a source of pressure to the table operating means, pattern means on the table for engag- ing and moving the tracer valve to its first position to complete the connection of said source of pressure to the table whereby the table will start to feed with the cross slide under control of the tracer for profiling a work piece.

22. In a pattern controlled machine tool having a power indexable tool spindle and a power operable work table having a feed stroke and a rapid return stroke, the combination of means for advancing said spindle to the table before the feed stroke and retracting said spindle after the feed stroke, pattern controlled means for controlling movement of the spindle during said feed stroke, means responsive to said retraction to index said spindle and effect rapid return of the table, and means responsive to the completion of said indexing to start the table feed stroke.

23. In a pattern controlled machine tool having a tool spindle, a power operable work table having a feed stroke and a rapid return stroke and power operable means for effecting axial indexing of said tool spindle, the combination of power means for advancing said spindle to the work table before the feed stroke and retracting said spindle after the feed stroke, pattern controlled means for controlling the movement of the spindle during said feed stroke, means responsive to spindle retraction to effect axial indexing of said spindle and rapid return of the work table, and means responsive to completion of said indexing to start the table on its feed stroke.

24. In a pattern controlled machine tool having a power indexable tool spindle and an indexable work support, the axes of said work support and spindle being parallel, power operable means to impart a feed stroke and a rapid return stroke to said work support laterally of its axis, means for advancing said spindle laterally of its axis to the work support before its feed stroke and to retract said spindle after said feed stroke, pattern controlled means for controlling the movement of said spindle during the feed stroke to effect a profiling operation on the work carried by said work support, means responsive to retraction of said spindle to effect axial indexing thereof and initiate rapid return of the work support, means responsive to the completion of the spindle indexing to initiate another feed stroke of the table, and means responsive to a predetermined number of spindle indexings to effect indexing of the work support.

25. In a pattern controlled milling machine having a reciprocating table and tool supporting means, the combination with pattern controlled tracer mechanism for controlling relative movement between the tool supporting means and said table in a direction normal to the path of table reciprocation, of a plurality of work fixtures supported on said table for oscillation between two positions, locating means for determining said positions including an interlock valve for each fixture, a hydraulic operating circuit including a source of pressure for effecting the cycle operation of the machine including oscillation of said fixtures, an electric control circuit having operative control connections with said hydraulic circuit for determining the cycle of operation effected thereby, said electrical circuit including a pressure operated switch serially connected through said interlock valves to said source of pressure, and means controlled by said pressure switch for interrupting cycle operation of said hydraulic circuit.

JOHN Q. BUCKLES.
GEORGE A. LENSKY.
WINTHROP TRIBLE.

REFERENCES CITED

The following references are of record in the file of this patent:

UNITED STATES PATENTS

| Number | Name | Date |
|---|---|---|
| 1,683,581 | Shaw | Sept. 4, 1928 |
| 2,044,020 | Sassen | June 16., 1936 |
| 2,111,332 | Roehm | Mar. 15, 1938 |
| 2,122,662 | Shaw | July 5, 1938 |
| 2,194,434 | Silven | Mar. 19, 1940 |
| 2,332,532 | Roehm | Oct. 26, 1943 |
| 2,400,691 | Grad | May 21, 1946 |
| 2,443,793 | Lensky | June 22, 1948 |
| 2,450,096 | Siekmann | Sept. 28, 1948 |